United States Patent [19]
Ohmi et al.

[11] Patent Number: 5,597,109
[45] Date of Patent: Jan. 28, 1997

[54] WELDING METHOD FOR FORMING CHROMIUM OXIDE PASSIVATED FILM AT WELDED PORTION, WELDING APPARATUS, AND PROCESS APPARATUS

[75] Inventors: Tadahiro Ohmi; Shinji Miyoshi, both of Sendai; Yasumitsu Mizuguchi, Higashimatsuyama, all of Japan

[73] Assignee: Osaka Sanso Kogyo Kabushiki Kaisha, Osaka, Japan

[21] Appl. No.: 296,542

[22] Filed: Aug. 26, 1994

[30] Foreign Application Priority Data

Aug. 24, 1993 [JP] Japan ................................. 5-209779

[51] Int. Cl.$^6$ .................... B23K 31/02; B23K 35/38
[52] U.S. Cl. ...................... 228/199; 228/219; 148/286
[58] Field of Search ................ 228/42, 219, 199; 148/286, 537, 527

[56] References Cited

U.S. PATENT DOCUMENTS

| | | | |
|---|---|---|---|
| 2,502,855 | 4/1950 | Kingston | 148/286 |
| 4,956,537 | 9/1990 | Schnorrer | 219/74 |
| 5,231,258 | 7/1993 | Hunt | 219/74 |
| 5,388,753 | 2/1995 | Bjorkman, Jr. | 228/42 |

FOREIGN PATENT DOCUMENTS 2133422  7/1984  United Kingdom ............. 148/286

*Primary Examiner*—P. Austin Bradley
*Assistant Examiner*—Jeffrey T. Knapp
*Attorney, Agent, or Firm*—Baker & Daniels

[57] ABSTRACT

The invention has as an object thereof to provide a welding method which is capable of forming an oxide passivated film, which is corrosion resistant, non-catalytic, and has an extremely small amount of released gasses, chiefly on the welded portion or in the vicinity thereof during the welding process. During the welding process, a gas in which 800 ppm~2.5% of moisture is contained in an inert gas is caused to flow, and a passivated film having chromium oxide as a chief component thereof is formed on the surface of the welded portion. The welding method comprises a welding process and a passivation process; in the passivation process, a gas in which 1000 ppm~2.5% of moisture is contained in an inert gas is employed. The apparatus is provided with a system for generating moisture, a system for supplying an inert gas or a mixed gas in which hydrogen is added to an inert gas as a back shield gas, a system for supplying a back shield gas comprising an inert gas containing moisture, and a mechanism for supplying these gasses to the portion to be welded via switching of both systems.

18 Claims, 4 Drawing Sheets

5,597,109

WELDING METHOD FOR FORMING CHROMIUM OXIDE PASSIVATED FILM AT WELDED PORTION, WELDING APPARATUS, AND PROCESS APPARATUS

BACKGROUND OF THE INVENTION

1. Field of the Invention

The present invention relates to a welding method for forming a chromium oxide passivated film at a welded portion, as well as to a welding apparatus and a process apparatus.

2. Description of Related Art

The pace of the development of semiconductor devices having high LSI and high performance has increased greatly, and manufacturing apparatuses which are capable of producing such semiconductor devices have been in demand, and energetic efforts have been made to produce atmospheres having a higher degree of vacuum and higher cleanliness.

In order to produce atmospheres having an ultra-high degree of vacuum and having ultra-high cleanliness, it is necessary to completely suppress the release of gas from the apparatus as well as from the gas supply piping system. As a result of diligent research efforts by the present inventors over a period of many years, a chromium oxide passivated film treatment method has been perfected, so that it has become possible to form, on a surface, an oxide passivated film having chromium oxide as a chief component thereof, which is corrosion resistant and non-catalytic, and which furthermore restricts gas release in the extreme. As a result, the present inventors have succeeded in producing an atmosphere in which the release of gas from the internal portions of the apparatus is restricted to an amount which is difficult to detect with present measuring devices.

However, as such apparatuses have become larger in scale, and as the complexity thereof has increased, it has become increasingly necessary to connect pipes or apparatuses by means of welding after the formation of the chromium oxide passivated film. Because the surface of the welded portions is not covered by a chromium oxide passivated film, gas easily adsorbs thereto and desorbs therefrom, and as the number of welds increases, the gas which is released therefrom reaches a level which is impossible to ignore, so that a new problem is generated in that the atmosphere becomes contaminated.

Furthermore, in apparatuses or piping systems employing corrosive gasses or the like, there are problems in that the welded portions are corroded, and as a result of this, the atmosphere becomes contaminated. The formation of an oxide passivated film in apparatuses or piping systems which are large-scale and have complicated forms requires a complex passivated film formation apparatus, and in particular in view of increasing costs, a welding method in which a passivated film can be formed simultaneously with welding has been strongly desired.

In view of the above points, the present invention has as an object thereof to provide a welding method which is capable of forming an oxide passivated film, which is corrosion resistant and non-catalytic and which releases extremely little gas, at welded portions and at the vicinity thereof during the welding process. Furthermore, the present invention has as a further object thereof to provide a process apparatus requiring an extremely clean atmosphere.

SUMMARY OF THE INVENTION

The first essential feature of the present invention resides in a welding method for forming a chromium oxide passivated film on a welded portion simultaneously with welding, characterized in that a back shield gas comprising an inert gas containing a moisture content within a range of 800 ppm~2.5% (volumetric percent) is caused to flow during the welding process, and an oxide passivated film having chromium oxide as a chief component thereof is formed on the surface of the welded portions.

A second essential feature of the present invention resides in a welding method for forming a chromium oxide passivated film on a welded portion, characterized in that, in a method for forming a chromium oxide passivated film on a welded portion containing a welding process and a passivation treatment process which is conducted after the welding, either an inert gas, or a back shield gas in which hydrogen is added to an inert gas, is employed in the welding process, and furthermore, a back shield gas, comprising an inert gas containing a moisture component within a range of 800 ppm~2.5%, is employed in the passivation treatment process.

A third essential feature of the present invention resides in a welding apparatus, characterized in being provided with: a system for the generation of a moisture component, a system for supplying an inert gas or a mixed gas in which hydrogen is added to an inert gas, as a back shield gas; a system for supplying a back shield gas comprising an inert gas containing a moisture component; and a mechanism for supplying to the portions to be welded via a switching of both systems.

A fourth essential feature of the present invention resides in a process apparatus for forming a chromium oxide passivated film on a welded portion, characterized in that, in a process apparatus employing welding in the assembly of the apparatus, in the welding process, an oxide passivated film having as a chief component thereof chromium oxide which is formed by a flow of a back shield gas comprising inert gas containing a moisture content within a range of 800 ppm~2.5%, is formed on a welded portion.

The welding method for forming a chromium oxide passivated film on a welded portion in accordance with the present invention is characterized in that a back shield gas comprising an inert gas containing a moisture content within a range of 800 ppm~2.5% is caused to flow during the welding process, and a oxide passivated film having chromium oxide as a chief component thereof is formed on the surface of the welded portion.

Furthermore, the process apparatus in accordance with the present invention is characterized in that, in a process apparatus employing welding in the execution of the apparatus, a back shield gas comprising an inert gas containing a moisture content within a range of 800 ppm~2.5% is caused to flow during the welding process, and an oxide passivated film having chromium oxide as a chief component thereof is formed on the surface of the welded portions.

During welding, by causing an appropriate moisture content to be contained in the back shield gas, it becomes possible to form an minute oxide passivated film having chromium oxide as a chief component thereof on the surface and simultaneously with welding.

Hereinbelow, the function of the present invention will be explained together with embodiment aspects of the present invention.

The amount of moisture content present in the back shield gas during welding is an extremely important condition for the formation of the chromium oxide passivated film, and the optimal content is greater than or equal to 800 ppm and less than or equal to 2.5%. Within this range, a range of 3000 ppm~1.5% is preferable, and within this range, the amount of chromium oxide contained in the passivated film increases, and a more minute film results. On the other hand, at moisture contents of less than 800 ppm, it is impossible to form an oxide passivated film having sufficient thickness, and furthermore, when a moisture content of 2.5% is exceeded, the thickness of the chromium oxide film becomes large, and problems such as cracking of the welds or the like occur.

When welding and passivated film formation are conducted simultaneously, it is preferable that the back shield gas contain hydrogen gas in an amount within a range of 1~10%. By means of adding this amount of hydrogen, an oxide passivated film containing a large amount of chromium oxide can be formed. The detailed reason for this is unclear; however, it is conjectured that by adding hydrogen, oxidation and reduction reactions occur simultaneously, and that reactions occur such that chromium is selectively oxidized, and iron is reduced. At amounts of less than 1%, such effects are difficult to produce. On the other hand, at amounts in excess of 10%, the surface of the bead portion becomes rough, and this is not desirable. That is to say, when the amount of hydrogen gas is 10% or less, a surface roughness on the level of 0.5 μm is obtainable; however, at amounts in excess of 10%, the surface roughness reaches the undesirable level of 1 μm.

With respect to the number of welding cycles, a single-cycle welding is preferable from the point of view of an increase in operational efficiency, and from the point of view of preventing the adhering of fumes. It is possible to conduct sound welding even with a single-cycle welding. In particular, by conducting welding in accordance with the recommended amount of applied heat and welding rate described hereinbelow, it is possible to guarantee an even sounder weld.

When the object to be welded is piping, it is acceptable to conduct welding by causing either the pipe or the welding electrode to rotate once.

In the present invention, it is preferable that the amount of heat applied to the welded portion be less than or equal to 600 joules/cm.

By setting the amount of applied heat to less than or equal to 600 joules/cm, it is possible to greatly reduce the amount of metallic fumes, such as Fe, Mn, Cr, and the like, remaining on the surface after welding.

A welding rate of 1 cm/sec or more is preferable. The amount of fumes generated differs depending on the welding rate even when identical amounts of heat are applied per unit of length; at rates of 1 cm/sec or more, the amount of fumes generated is greatly reduced. A rate of 1.5 cm/sec or less is further preferable. When the rate exceeds 1.5 cm/sec, there are cases in which the degree of surface roughness in the welded portion decreases.

Welders employing, for example, discharge or lasers may be used as the welder of the present invention. Examples of welders employing discharge include, for example, tungsten inert gas welding, arc gas welding, and the like.

In a method for the formation of a chromium oxide passivated film on the welded portions which contains a welding process and a passivation treatment process which is conducted after welding, an inert gas or a mixed gas in which hydrogen is added to an inert gas is employed as the back shield gas in the welding process, and furthermore, a gas comprising an inert gas containing a moisture content within a range of 1000 ppm~2.5% is used in the passivation treatment process.

The moisture content in the case in which the passivated film is formed after welding is within a range of 1000 ppm~2.5%. At a moisture content of less than or equal to 1000 ppm, it is impossible to form an oxide passivated film having a sufficient thickness, and furthermore, when the moisture content is greater than or equal to 2.5%, the thickness of the chromium oxide becomes great, and problems are generated such as the cracking of the welds or the like. Furthermore, in this case as well, for the reasons described above, it is desirable that an amount of oxygen within a range of 1~10% be added to the back shield gas.

The passivation treatment may employ a special heating mechanism; however, if the welder is used as the heating mechanism, it is not necessary to use a separate heating mechanism, and furthermore, since it is possible to heat only the restricted area of the welded portions, this is preferable. For example, the heat source (arc, laser) of the welder may be moved relatively and heating thus conducted. However, at this time, it is necessary to employ an amount of applied heat and a heating rate which will not be such as to cause melting of previously completed welded portions, and such a level may be determined by means of appropriate experimentation.

With respect to the number of heating cycles, a single-cycle heating is preferable from a point of view of operational efficiency; in order to form a chromium oxide passivated film with a single-cycle heating, the relative movement rate of the heating source should be greater than or equal to 0.5 cm/sec and less than or equal to 1 cm/sec, and the amount of applied heat should be set to 200 joules/cm or more.

It is preferable that this passivated film formation treatment be conducted when the temperature of the welded portion has decreased to a predetermined temperature immediately after welding, and while introducing a moisture component into the back shield gas. It is also advantageous to use the heating source of the welder when conducting the passivation film formation treatment immediately after welding.

A welding system such as that shown, for example, in FIG. 1 may be employed.

In FIG. 1, references 1a, 1b, 1c, 1d, and 15 indicate mass flow controllers. A mixed gas of oxygen and argon and a mixed gas of hydrogen and argon are introduced into moisture generator 4. The inner surface of the moisture generator 4, comprises, for example, an alloy containing Ni such as SUS 316L or the like, and an oxide passivated film is formed on this surface. This oxide passivated film is formed, after electro-polishing or compound electro-polishing, by heat treatment in an oxidizing or a weakly oxidizing atmosphere having an impurity concentration on the level of a few ppb or less (see, for example, Japanese Patent Application No. Sho 63-5389, PCT/JP 92/699, and Japanese Patent Application No. Hei 4-164377). This moisture generator is then heated to a temperature within a range of 50°~500° C. (preferably within a range of 300°~500° C.) by, for example, micro-heater 16.

Within this moisture generator 4, when the mixed gas of hydrogen and argon and the mixed gas of oxygen and argon gas are introduced thereinto, as described above, the passivated film described above functions as a catalyst, and the hydrogen and oxygen become radicals, these radicals react, and moisture is produced. At this time, if the amount of oxygen is less than or equal to one-half the amount of hydrogen, then a mixed gas of moisture and argon gas, or a mixed gas of moisture, hydrogen, and argon gas can be obtained. Accordingly, if the hydrogen concentration and oxygen concentration are appropriately adjusted, then a mixed gas of moisture or hydrogen, at desired concentrations, with argon gas, is obtainable. This mixed gas is introduced into sample (in FIG. 1, a pipe) 11 via switching valve 5, and the sample may be rotated at a pre-specified speed, and welded by means of welder 13.

Moisture generator 4 need not have the above described passivated film formed on the inner surface thereof; the interior thereof may be filled with Ni (a catalyst).

On the other hand, in the case of the formation of a passivated film in two processes, first, the valve 5b of the switching valve 5 is closed, and valve 5a is opened, a gas containing hydrogen is introduced from gas tank 7 into the interior of sample 11 via switching valve 5, and welding is conducted. Next, valve 5a is closed, and valve 5b is opened, and an argon gas containing a predetermined moisture concentration is introduced into sample 11 from moisture generator 4, and a passivated film is formed on the welded portion.

What is meant by a "process apparatus" in the present invention is a semiconductor manufacturing apparatus, superconductor thin film manufacturing apparatus, magnetic thin film manufacturing apparatus, metallic thin film manufacturing apparatus, dielectric thin film manufacturing apparatus, or the like; for example, film formation apparatuses or processing apparatuses employing sputtering, vapor deposition, CVD, PCVD, MOCVD, MBE, dry etching, ion implantation, diffusion and oxidation furnaces, or the like, or furthermore, evaluation apparatuses employing Auger electron appearance spectroscopy, XPS, SIMS, RHEED, TREX, or the like. Furthermore, piping systems for supplying gas thereto, as well as super-clean water production and supply apparatuses, are also included in the processing apparatus of the present invention.

Figure 1:
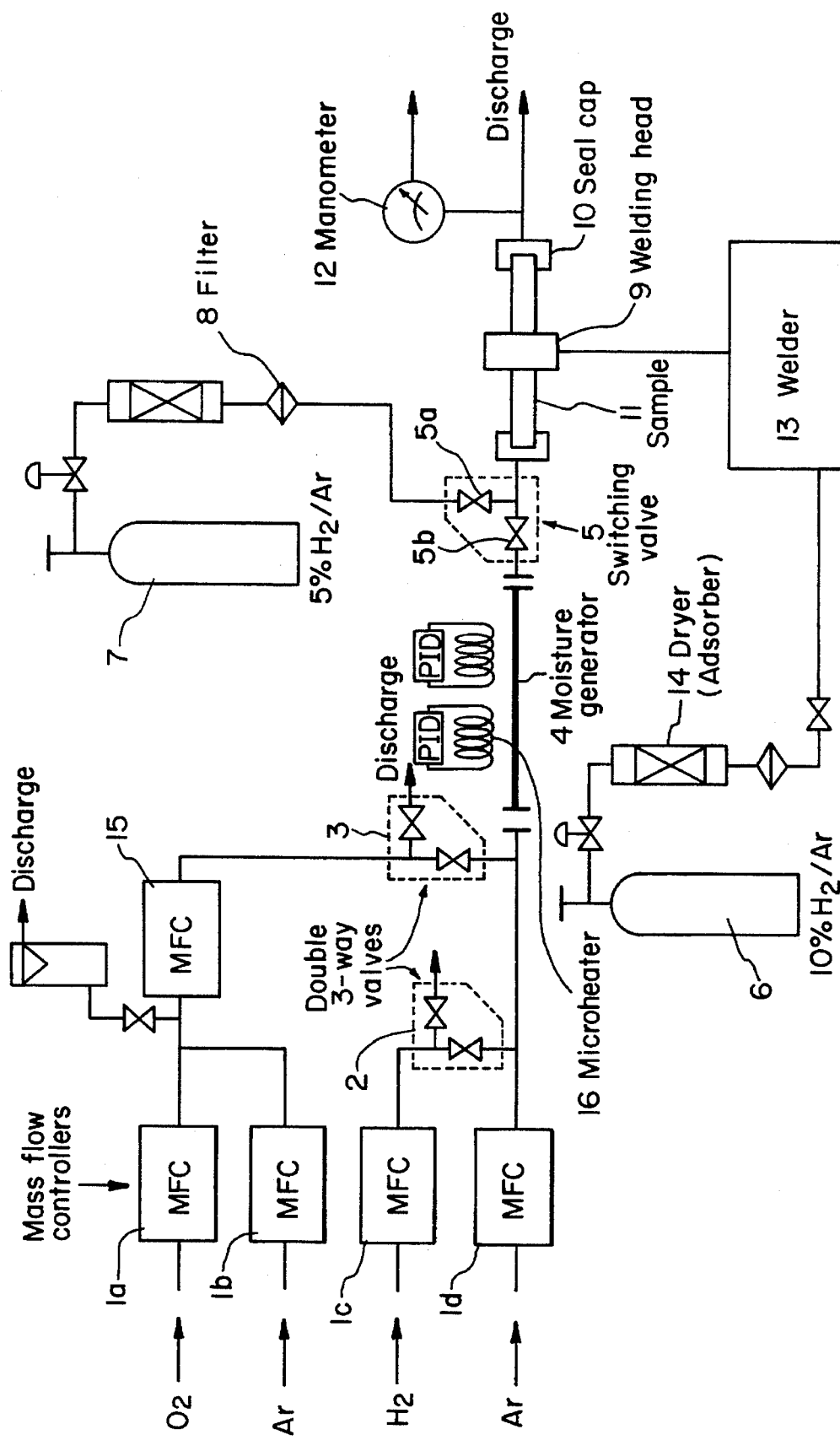
FIG. 1 is a conceptual diagram of a welding system.

1a, 1b, 1c, 1d, 15 Mass flow controllers
2, 3 Double 3-way valves
4 Moisture generator
5a, 5b Switching valves
6, 7 Gas tanks
8 Filter
9 Welding head
10 Seal cap
11 Sample (in FIG. 1, a pipe)
12 Meter
13 Welder
14 Dryer
16 Micro-heater

DETAILED DESCRIPTION OF THE INVENTION

Hereinbelow, the present invention will be explained in detail by way of embodiments.

Embodiment 1

An SUS 316L pipe having a diameter of ¼ inch, which was subjected to electro-polishing so that the surface roughness thereof was 1 μm or less, was employed as the welding sample, and a 10% $H_2$/Ar gas containing 5000 ppm of moisture was used in the pipe as the back shield gas. The welding was conducted using TIG welding. Welding conditions were such that welding was conducted for one revolution at a welding rate of 30 rpm (with ¼ inch pipe, 1 cm/sec).

Figure 2:
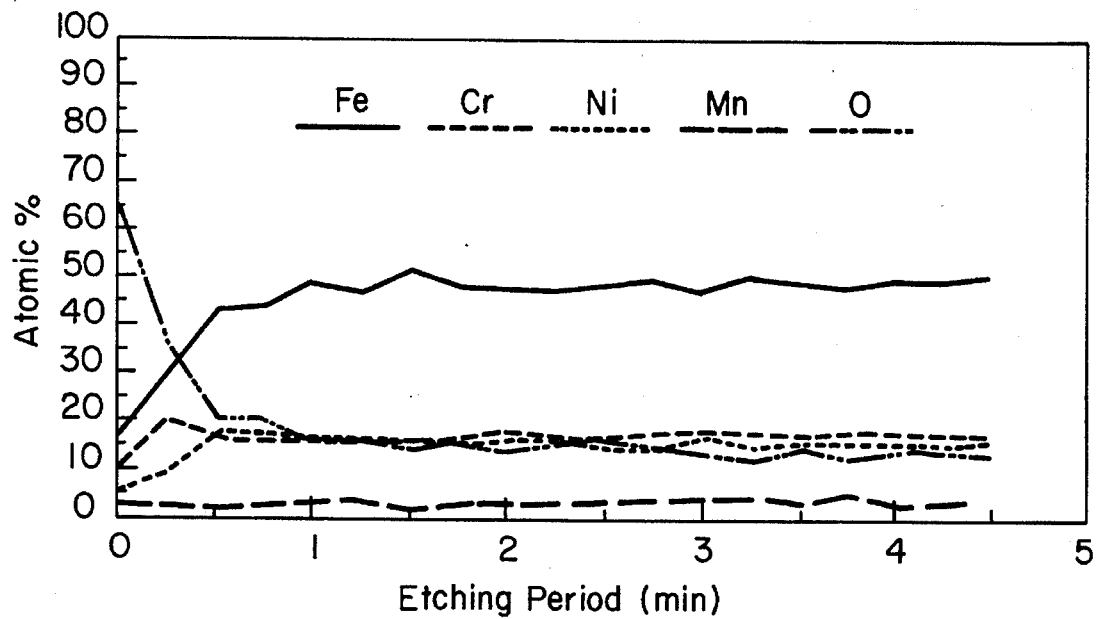
FIG. 2 is a graph showing the results wherein the component distribution in the direction of depth in the surface of the welded portion in a comparative example was analyzed by means of XPS (X-ray photoelectric scanning).
Figure 3:
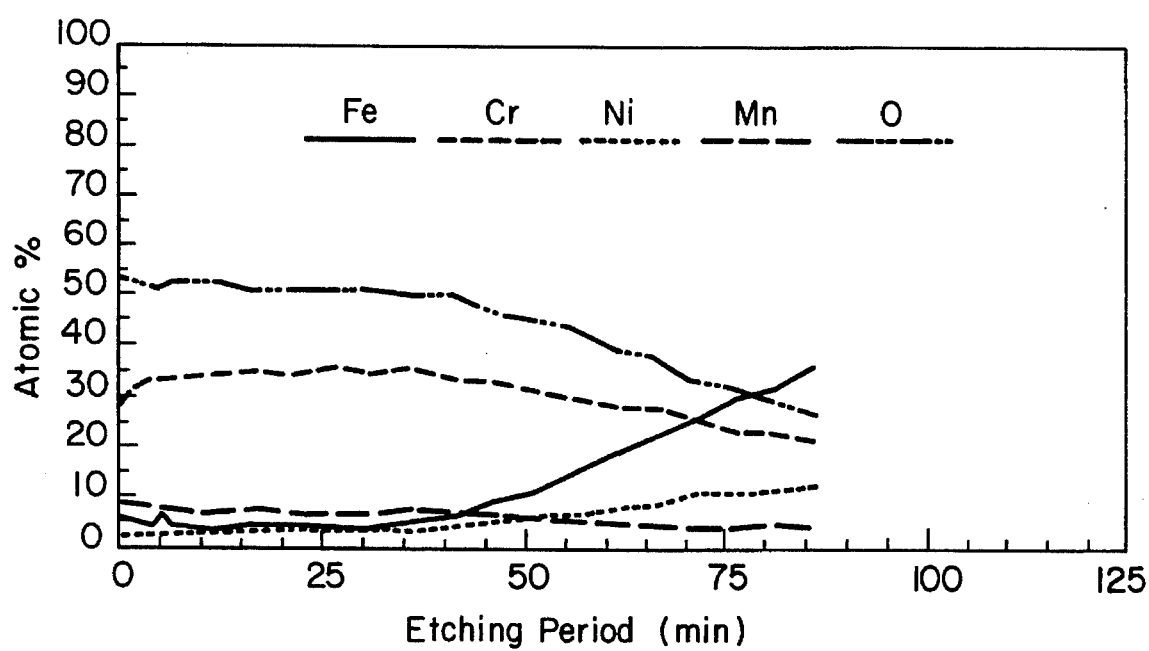
FIG. 3 is a graph showing the results when the component distribution in the direction of depth in the surface of the welded portion in Embodiment 1 was analyzed using XPS (X-ray photoelectric scanning).

The component distribution in the direction of depth in the surface of the welded portion, after butt welding was conducted under a flow of the back shield gas described above, was analyzed by means of XPS (X-ray photoelectric scanning). Results are shown in FIG. 3. In FIG. 3, the vertical axis indicates the atomic composition ratio, while the horizontal axis indicates the etching time of the surface by means of sputtering. The etching rate was set to approximately 10 nm/min. The welded pipe samples thus obtained were divided into a: pipes which were not subjected to chromium oxide passivation treatment [back shield gas: 5% $H_2$/Ar] (FIG. 2), and b: pipes which were subjected to chromium oxide passivation treatment [back shield gas: 5000 ppm $H_2O$+10% $H_2$/Ar] (FIG. 3).

As is clear from the Figures, by conducting welding with back shield gas containing moisture, a thick oxide passivated film containing a large amount of chromium oxide was formed on the welded portion.

Figure 4:
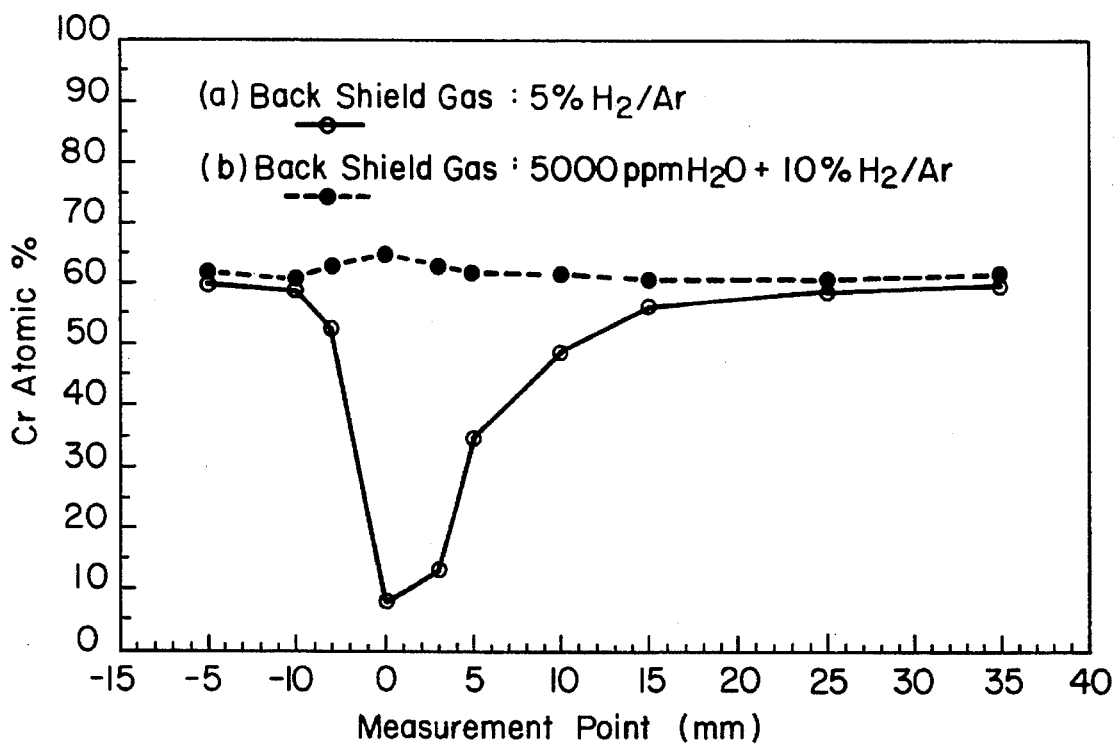
FIG. 4 is a graph showing the results when the Cr component ratio in the outermost surface of the welded portion in Embodiment 1 was analyzed using XPS (X-ray photoelectric scanning).

Furthermore, the Cr component ratio of the outermost surface within a range of from 10 nm upstream from the welded bead portion to 35 nm downstream therefrom, with respect to the back shield gas flow, was analyzed. The results are shown in FIG. 4. The horizontal axis indicates the measurement point, while the vertical axis indicates the ratio of the detected amount of Cr with respect to the total detected amount of Fe, Cr, Ni, and Mn. (a) indicates the case in which welding was conducted using a conventional hydrogen/argon mixed gas as the back shield gas, while (b) indicates the case in which welding was conducted using a 5000 ppm $H_2O$+10% $H_2$/Ar gas as the back shield gas. As is clear from the Figure, the component ratio of Cr in the bead portion of the sample which was subjected to chromium oxide passivation treatment increased by approximately 5% with respect to the background level. Clearly, by conducting chromium oxide passivation treatment on the welding bead portion, the component ratio of Cr in the vicinity of the welding bead portion is greatly increased in comparison to that conventionally obtained.

Figure 5:
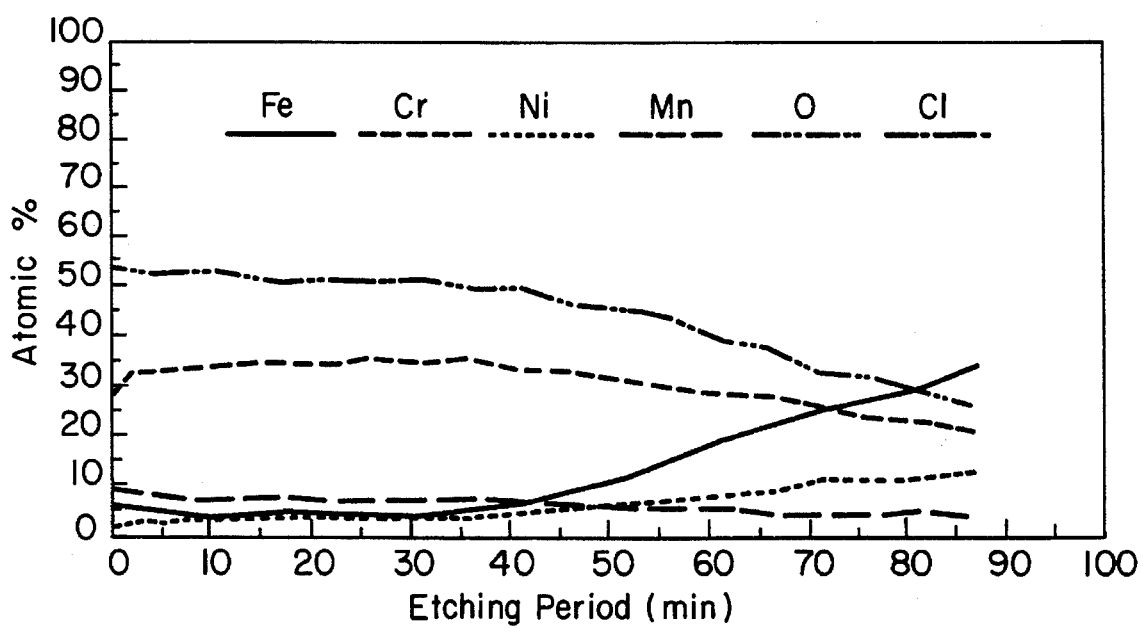
FIG. 5 is a graph showing the results when the component distribution in the direction of depth in the surface of the welded portion after corrosion testing in Embodiment 1 was analyzed using XPS (X-ray photoelectric scanning).

Next, the piping tube containing the welded portion was immersed for a period of 7 hours in a 1% HCl solution. There were two types of welding samples which were used in this immersion: a pipe (a) in which welding was conducted using a conventional hydrogen/argon mixed gas as the back shield gas, and a pipe (b) in which welding was conducted using a back shield gas containing moisture, as described above. Both samples were sufficiently washed with ultrapure water after immersion in the HCl, and were dried, and when the inner surface of the welding bead portion thereof was inspected with a light microscope, corrosion was noted on the surface of the welded portion of sample (a); however, in sample (b), absolutely no corrosion could be found, similarly to the non-welded portion. After this, the component distribution in the direction of depth in the surface of the welded portion of sample (b) was analyzed using XPS (X-ray photoelectric scanning). The results thereof are shown in FIG. 5. As is clear from a comparison of the results shown in this Figure with the profile prior to immersion (FIG. 3), chlorine could not be detected, and almost no change was observed in the component ratio of each element in the direction of depth. That is to say, it was discovered that by using a gas containing moisture as the back shield gas, as shown in the present embodiment, an oxide passivated film possessing superior resistance to corrosion was formed.

Embodiment 2

A tube comprising a SUS 316L pipe having a diameter of ¼ inch which was subjected to electro-polishing was used as the welding sample, and first, single-revolution welding was conducted at a welding rate of 30 rpm using an argon gas containing 5% of hydrogen as the back shield gas. Next, the back shield gas was switched to a 10% $H_2$/Ar gas containing 5000 ppm of moisture, and one-cycle welding was again conducted at a welding rate of 7.5 rpm and reducing the welding current to approximately ⅓ of that initially employed. In the second welding process, the bead portion formed in the initial welding is heated, in order to render this bead portion susceptible to the formation of a chromium oxide passivated film, and the amount of inputted heat is adjusted so as to have no effect on the bead width of the welded portion. That is to say, the welding method depicted in this Embodiment comprises 2 processes, wherein the initial process securely joins the portions to be welded, while the subsequent process comprises a chromium oxide passivation treatment of the welded portion. A flow diagram thereof is shown in FIG. 1.

Figure 6:
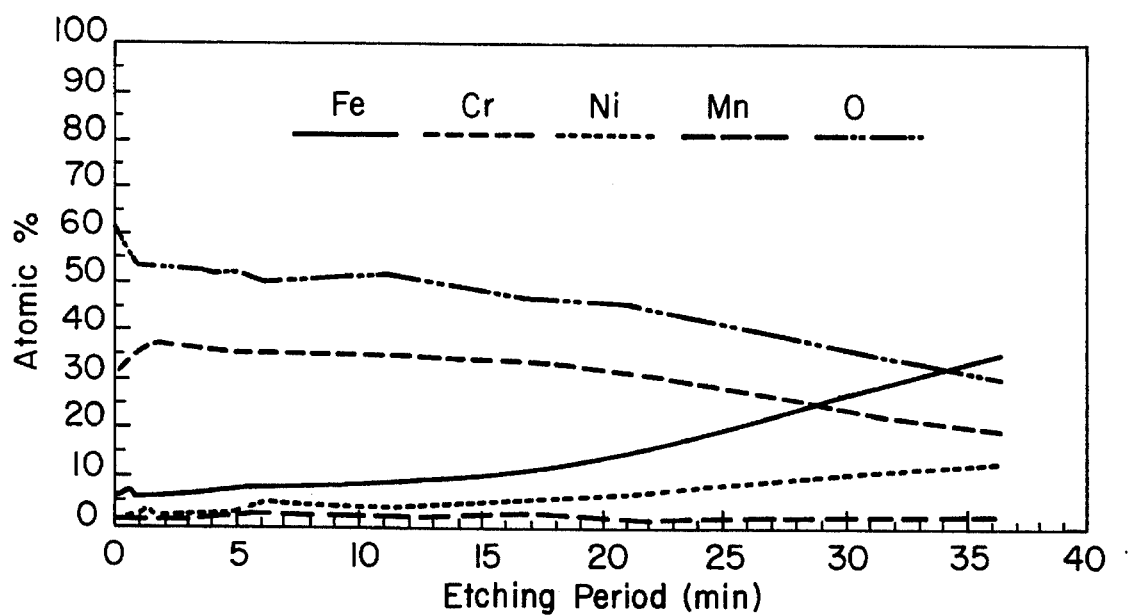
FIG. 6 is a graph showing the results obtained when the component distribution in the direction of depth in the surface of the welded portion in Embodiment 2 was analyzed using XPS (X-ray photoelectric scanning).

The results of an analysis, by means of XPS, of the component distribution of the surface of the bead portion of the welding sample produced in accordance with this welding method, in the direction of depth thereof, are shown in FIG. 6. In comparison with a profile (FIG. 2) in which treatment was conducted with a back shield gas containing 5000 ppm of moisture during welding, the etching period at which Fe and Cr intersect is shorter; however, an oxide film having chromium as a chief component thereof is formed.

Furthermore, a 7-hour immersion test was conducted employing a 1% HCl solution, as in Embodiment 1; however, as with the results in Embodiment 1, corrosion was not observed, and chlorine was not detected in the direction of depth by means of XPS. In short, it was determined that a chromium oxide film which had superior resistance to corrosion could be formed by means of this welding method, as well.

Embodiment 3

Figure 7:
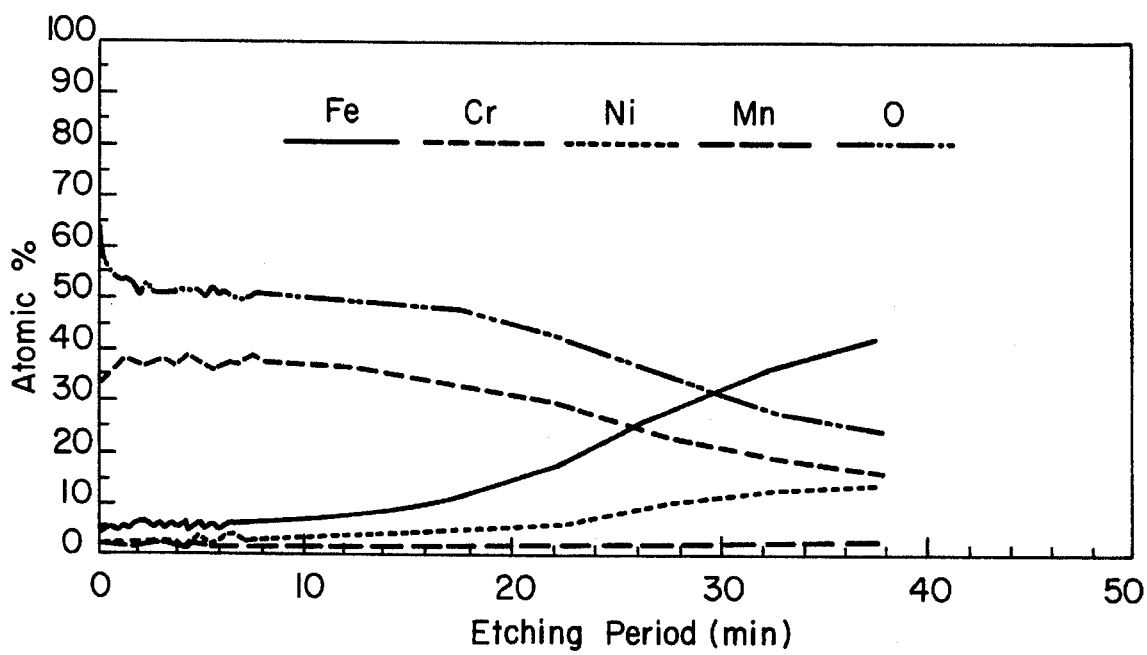
FIG. 7 is a graph showing the results obtained when the component distribution in the direction of depth in the surface of the welded portion in Embodiment 3 was analyzed using XPS (X-ray photoelectric scanning).

A tube comprising an SUS 316L pipe having a diameter of ¼ inch which was subjected to electro-polishing was employed as the welding sample, and first, welding was conducted for one revolution at a welding rate of 30 rpm using an argon gas containing hydrogen in an amount of 5% as the back shield gas. Next, this gas was switched to a 10% $H_2$/Ar gas containing 5000 ppm of moisture, and this gas was caused to flow through the welding sample without exposure of the welding sample to the atmosphere. In this state, the welded portion was heated to a predetermined temperature by means of a resistance heating method. After heating for a fixed period, the temperature of the welded portion returned to room temperature. As in Embodiments 1 and 2, an evaluation of the welded portion by means of XPS was conducted. The results thereof are shown in FIG. 7. The etching period at which Fe and Cr intersect is shorter than the value shown in Embodiment 2 (FIG. 6); however, by adopting a resistance heating method in the passivation treatment process, and heating the welded portion while causing a flow of a gas containing a predetermined moisture concentration, as well, it is possible to form a film having chromium oxide as a chief component.

As described in the foregoing, in accordance with the present invention, by conducting welding while supplying a gas containing a moisture component as a back shield gas during the welding process, or by again heating the welded portion while supplying a gas containing a moisture content as a back shield gas after welding, it is possible to conduct the passivation treatment of a welded portion having a thick chromium oxide film, and it becomes possible to provide an ultra-clean process apparatus, an ultra-pure gas supply piping system, and an ultra-pure water and supply apparatus.

We claim:

1. A method for forming a chromium oxide passivated film on a welded area during the welding process, said method comprising the steps of:

providing a flow of back shield gas comprising an inert gas having 800 ppm–2.5% (volumetric percent) of moisture around an area to be welded;

welding the area; and forming an oxide passivated film having chromium oxide as a chief component on the surface of the welded area during welding.

2. A method for forming a chromium oxide passivated film on a welded area in accordance with claim 1, characterized in that said back shield gas provided in said providing step contains hydrogen gas in an amount of 1–10%.

3. A method for forming a chromium oxide passivated film on a welded area in accordance with claim 2, characterized in that said welding step comprises single cycle welding.

4. A method for forming a chromium oxide passivated film on a welded area in accordance with claim 1, characterized in that said welding step comprises single-cycle welding.

5. A method for forming a chromium oxide passivated film on a welded area in accordance with claim 4, characterized in that said welding step comprises welding by applying an amount of heat to the welded area of at most 600 joules/cm.

6. A method for forming a chromium oxide passivated on a welded area in accordance with claim 5, characterized in that said welding step comprises welding at a welding rate of at least 1 cm/sec and at most 1.5 cm/sec.

7. A method for forming a chromium oxide passivated film on a welded area, said method comprising the steps of:
providing a flow of a back shield gas comprising one of an inert gas and an inert gas containing hydrogen gas around the area to be welded;
welding the area;
providing a flow of a second back shield gas comprising an inert gas having 1000 ppm–2.5% of moisture; and
conducting a passivation treatment on the welded area.

8. A method for forming a chromium oxide passivated film on a welded area in accordance with claim 7, characterized in that the back shield gas in said second providing step contains 1–10% of hydrogen gas.

9. A method for forming a chromium oxide passivated film on a welded area in accordance with claim 8, characterized in that said welding step comprises single cycle welding.

10. A method for forming a chromium oxide passivated film on a welded area in accordance with claim 8, characterized in that said passivation treatment step comprises moving the heating source of the welder relative to the welded area.

11. A method for forming a chromium oxide passivated film on a welded area in accordance with claim 7, characterized in that said welding step comprises single-cycle welding.

12. A method for forming a chromium oxide passivated film on a welded area in accordance with claim 11, characterized in that said passivation treatment step comprises moving the heating source of the welder relative to the welded area.

13. A method for forming a chromium oxide passivated film on a welded area in accordance with claim 11, characterized in that said welding step comprises applying an amount of heat equal to, at most 600 joules/cm to the area being welded.

14. A method for forming a chromium oxide passivated film on a welded area in accordance with claim 13, characterized in that said welding step comprises welding at a welding rate of at least 1 cm/sec and at most 1.5 cm/sec.

15. A method for forming a chromium oxide passivated film on a welded area in accordance with claim 13, characterized in that said passivation treatment step comprises moving the heating source of the welder relative to the welded area.

16. A method for forming a chromium oxide passivated film on a welded area in accordance with claim 7, characterized in that said passivation treatment step comprises heating the welded area by moving the heating source of the welder relative to the welded area.

17. A method for forming a chromium oxide passivated film on a welded area in accordance with claim 16, characterized in that said heating comprises single-cycle heating.

18. A method for forming a chromium oxide passivated film on a welded area in accordance with claim 17, characterized in that said heating is conducted by moving the heating source relative to the welded area at a speed of at least 0.5 cm/sec and at most 1.5 cm/sec and applying at least an amount of heat equal 200 joules/cm.

* * * * *